United States Patent
Piratla et al.

(10) Patent No.: US 8,990,676 B2
(45) Date of Patent: Mar. 24, 2015

(54) METHODS AND SYSTEMS FOR PROCESSING APPLICATION FORMS

(75) Inventors: Nischal M. Piratla, Bangalore (IN); Kovendhan Ponnavaikko, Chennai (IN); Chithralekha Balamurugan, Bangalore (IN); Michael Robert Campanelli, Webster, NY (US)

(73) Assignee: Xerox Corp, Norwalk, CT (US)

( * ) Notice: Subject to any disclaimer, the term of this patent is extended or adjusted under 35 U.S.C. 154(b) by 411 days.

(21) Appl. No.: 13/567,110

(22) Filed: Aug. 6, 2012

(65) Prior Publication Data

US 2014/0040717 A1  Feb. 6, 2014

(51) Int. Cl.
*G06F 17/22* (2006.01)
*G06F 17/24* (2006.01)

(52) U.S. Cl.
CPC .................................. *G06F 17/243* (2013.01)
USPC .......................................... 715/224; 221/226

(58) Field of Classification Search
CPC .............. G06F 3/04883; G06F 17/243; G06F 17/2247; G06F 17/2725; G06F 17/248
USPC ................................................ 715/221, 224
See application file for complete search history.

(56) References Cited

U.S. PATENT DOCUMENTS

2012/0159296 A1*  6/2012  Rebstock et al. ............. 715/205

* cited by examiner

*Primary Examiner* — Adam M Queler
*Assistant Examiner* — Seung Jung
(74) *Attorney, Agent, or Firm* — Joseph E. Root

(57) ABSTRACT

A method for processing application forms comprising extracting content from filled first forms of consumers, each of the first forms comprising one or more fields, arranging the extracted content of one or more fields of the plurality of fields of the plurality of filled first forms in a first matrix; encoding the content of each of the rows of the first matrix to define a second matrix; and disposing the encoded content of the second matrix in multiple empty second forms such that content of one column is disposed on only one of the empty second forms, each of the second forms includes the same type and number of fields as that of one of the filled first forms, further wherein the number of the filled second forms is based on the number of the one or more fields in the filled first forms.

15 Claims, 18 Drawing Sheets

500
502A  502B  502G  502D

| HEALTH INSURANCE CLAIM FORM |
|---|

ID NUMBER:
GROUP NUMBER:  IDENTIFICATION NUMBER:

PATIENT INFORMATION - A separate claim form must be completed for each family member.
PATIENT'S FULL LEGAL NAME (Last, First, Middle initial) | SEX ☐MALE ☐FEMALE | SOCIAL SECURITY NUMBER(required) ___/__/____ | DATE OF BIRTH MONTH DAY YEAR
PATIENT IS:  ☐MEMBER ☐SPOUSE ☐CHILD    OTHER please explain relationship:
F CLAIM IS FOR CHILD IS OR OLDER - IS CHILD:      A full time student? ☐ YES ☐ NO      HANDICAPPED? ☐ YES ☐ NO

PAYEE
☐ MAKE PAYMENT TO THE PROVIDER, (hospital, doctor etc.), OR
☐ MAKE PAYMENT TO MEMBER, the provider has been paid

MEMBER INFORMATION
MEMBER POLICY HOLDER NAME: | SOCIAL SECURITY NUMBER(required) ___/__/____ | DATE OF BIRTH MONTH DAY YEAR
CURRENT ADDRESS: | HOME PHONE: (___)___-____
IF COVERAGE IS THRU YOUR EMPLOYER PROVIDE    GROUP (EMPLOYER) NAME: | WORK PHONE: (___)___-____

CLAIM INFORMATION:
IS CLAIM FOR AN ACCIDENTAL INJURY? ☐ YES ☐ NO | IS THIS A WORKER COMPENSATION CLAIM? ☐ YES ☐ NO | DATE OF ACCIDENT:
BRIEFLY DESCRIBE INJURY:

*COMPLETE BELOW IF NON-ACCIDENTAL INJURY OR ILLNESS*
DATE FIRST TREATED:    BRIEFLY DESCRIBE THE CONDITION(S) FOR WHICH THE PATIENT RECEIVED THESE SERVICES:
(You can usually copy the diagnosis or description of service from the provider bill)

OTHER INSURANCE INFORMATION
Are there any OTHER medical benefits available to you, your spouse, or your dependants from OTHER Group Insurance, Other Employer, Labor or Professional Organizations, School, ect.?
☐Yes (provide below) ☐ No
POLICY HOLDER NAME: | SOCIAL SECURITY NUMBER(required) ___/__/____
POLICY HOLDER IS:  ☐ MEMBER ☐ SPOUSE ☐ CHILD  ☐ OTHER, please explain relationship
INSURANCE CARRIER NAME: | POLICY NUMBER: | EFFECTIVE DATE:
ADDRESS: | HOME PHONE: (___)___-____

SIGN
HERE _____    DATE _____
         Signature of member

Note:_____

| HEALTH INSURANCE CLAIM FORM |
|---|

ID NUMBER:
GROUP NUMBER: 1104583   IDENTIFICATION NUMBER: A123BXA8

PATIENT INFORMATION - A separate claim form must be completed for each family member.
PATIENT'S FULL LEGAL NAME (Last, First, Middle initial): YOGENDRA KUMAR
SEX: ☐ MALE ☐ FEMALE
SOCIAL SECURITY NUMBER (required): ABC/12/PGES
DATE OF BIRTH MONTH DAY YEAR: 98
PATIENT IS: ☑ MEMBER ☐ SPOUSE ☐ CHILD   OTHER please explain relationship:
F CLAIM IS FOR CHILD IS OR OLDER - IS CHILD: A full time student? ☐ YES ☑ NO   HANDICAPPED? ☐ YES ☑ NO

PAYEE
☐ MAKE PAYMENT TO THE PROVIDER, (hospital, doctor etc.), OR
☑ MAKE PAYMENT TO MEMBER, the provider has been paid

MEMBER INFORMATION
MEMBER POLICY HOLDER NAME: SANJIB KAR
SOCIAL SECURITY NUMBER (required): ---/--/----
DATE OF BIRTH MONTH DAY YEAR: 58
CURRENT ADDRESS: 8th Cross road, Hoodi, Bangalore
HOME PHONE:
IF COVERAGE IS THRU YOUR EMPLOYER PROVIDE   GROUP (EMPLOYER) NAME: N/A
WORK PHONE:

CLAIM INFORMATION:
IS CLAIM FOR AN ACCIDENTAL INJURY? ☑ YES ☐ NO
IS THIS A WORKER COMPENSATION CLAIM? ☐ YES ☑ NO
DATE OF ACCIDENT: 15/1/12
BRIEFLY DESCRIBE INJURY: EYE INJURY

COMPLETE BELOW IF NON-ACCIDENTAL INJURY OR ILLNESS
DATE FIRST TREATED: 10/1/12
BRIEFLY DESCRIBE THE CONDITION(S) FOR WHICH THE PATIENT RECEIVED THESE SERVICES:
(You can usually copy the diagnosis or description of service from the provider bill)

OTHER INSURANCE INFORMATION
Are there any OTHER medical benefits available to you, your spouse, or your dependants from OTHER Group Insurance, Other Employer, Labor or Professional Organizations, School, ect.?
☐ Yes (provide below) ☑ No
POLICY HOLDER NAME:
SOCIAL SECURITY NUMBER (required): AGE/12/ACD
POLICY HOLDER IS: ☐ MEMBER ☑ SPOUSE ☐ CHILD ☐ OTHER, please explain relationship
INSURANCE CARRIER NAME: S K KAR
POLICY NUMBER: RM12345
EFFECTIVE DATE: 10/8/11
ADDRESS: 8th Cross Road, Hood, Bangalore
HOME PHONE: (___)___-____

SIGN HERE _____ Signature of member   DATE 8/2/12

Note:

HEALTH INSURANCE CLAIM FORM

ID NUMBER:
GROUP NUMBER: 1104583          IDENTIFICATION NUMBER: YG290593

PATIENT INFORMATION - A separate claim form must be completed for each family member.
PATIENT'S FULL LEGAL NAME (Last, First, Middle initial)  SEX  SOCIAL SECURITY NUMBER(required)  DATE OF BIRTH MONTH DAY YEAR
Rakesh Kumar Devalapally  ☐MALE ☐FEMALE  A3C/12P685  01 04 91
PATIENT IS: ☑MEMBER ☐SPOUSE ☐CHILD  OTHER please explain relationship:
F CLAIM IS FOR CHILD 18 OR OLDER - IS CHILD:  A full time student? ☐ YES ☑NO  HANDICAPPED? ☐ YES ☑NO

PAYEE
☐ MAKE PAYMENT TO THE PROVIDER, (hospital, doctor etc.), OR
☑ MAKE PAYMENT TO MEMBER, the provider has been paid

MEMBER INFORMATION
MEMBER POLICY HOLDER NAME: SANJIB KAR    SOCIAL SECURITY NUMBER(required): ___/__/___    DATE OF BIRTH MONTH DAY YEAR 88
CURRENT ADDRESS: 8th Crossroad, Hoodi Bangalore    HOME PHONE:
IF COVERAGE IS THRU YOUR EMPLOYER PROVIDE  GROUP (EMPLOYER) NAME: N/A    WORK PHONE:

CLAIM INFORMATION:
IS CLAIM FOR AN ACCIDENTAL INJURY? ☑YES ☐NO    IS THIS A WORKER COMPENSATION CLAIM? ☐YES ☑NO    DATE OF ACCIDENT: 15/11/12
BRIEFLY DESCRIBE INJURY: EYE INJURY

COMPLETE BELOW IF NON-ACCIDENTAL INJURY OR ILLNESS
DATE FIRST TREATED: 10/1/12    BRIEFLY DESCRIBE THE CONDITION(S) FOR WHICH THE PATIENT RECEIVED THESE SERVICES:
(You can usually copy the diagnosis or description of service from the provider bill)

OTHER INSURANCE INFORMATION
Are there any OTHER medical benefits available to you, your spouse, or your dependants from OTHER Group Insurance, Other Employer, Labor or Professional Organizations, School, ect.?
☐Yes (provide below) ☑No
POLICY HOLDER NAME:    SOCIAL SECURITY NUMBER(required) P&K/12/A-B-D
POLICY HOLDER IS: ☐MEMBER ☑SPOUSE ☐CHILD ☐OTHER, please explain relationship
INSURANCE CARRIER NAME: S.K. KAR    POLICY NUMBER: RM12345    EFFECTIVE DATE: 15/8/11
ADDRESS: 8th Cross Road, Hoodi, Bangalore    HOME PHONE: (__)___-____

SIGN HERE ___Signature___    DATE 8/2/12
Signature of member

Note:

FIG. 10B

METHODS AND SYSTEMS FOR PROCESSING APPLICATION FORMS

TECHNICAL FIELD

Broadly, the presently disclosed embodiments relate to application forms for various business services, more particularly, to methods and systems for processing the data content of the application forms.

BACKGROUND

Business services, such as banking, insurance, telecom or postal play a significant role in the day-to-day life of individuals. To access any of the services, customers must fill out two or more application forms, which generally vary depending on the type of service. For example, if the consumer wishes to open a new account with a bank, she has to fill out an account opening form, but if the customer wants to apply for a loan, he or she has to fill out the corresponding loan application form. In the current scenarios, a customer fills out an application form in front of a branch representative and then the completed application form is transferred to a back-office or head office. In the back-office, these forms are processed along with various other forms received from other branches and then stored in a database for later retrieval.

The customer usually fills out the form manually and an employee of the business process company enters that hand written information into a database at a back-office of the business process company. Concealing the identity of the consumer while processing a filled application form is of significant relevance to the business process handling industry, to comply with privacy regulations, and gain a reputation for the same. The employee entering the data can see and access responses to fields entered by the consumer, e.g. SSN, phone number address, and so forth from the filled forms. Some of these responses may identify the consumer when used individually, or in combination, such as name and phone number, and may reveal a significant amount of sensitive information about the consumer, which ideally should be kept confidential.

These days many companies that strictly adhere to regulations of confidentiality do handling of such forms by taking the employee of the institute entering the data into confidence. Another approach for solving this problem is to remove the description of the field (question) from the form automatically before it reaches the employee, i.e., by black marking the query, e.g., "Please enter your SSN" in the form. All these methods help only to a certain extent. The employee can however figure out that a 9-digit number is a social security number, a 10-digit number is a phone number, a given zip code translates to city 'A', and so on.

Thus, there exists a need for methods or systems to process the application forms including confidential data in a secure manner. Such methods and systems will give a client more confidence in putting consumer data into other companies' hands likewise the companies themselves can achieve a competitive advantage with better methods.

SUMMARY

A method for processing application forms comprising extracting content from filled first forms of consumers, each of the first forms comprising one or more fields, arranging the extracted content of one or more fields of the plurality of fields of the plurality of filled first forms in a first matrix; encoding the content of each of the rows of the first matrix to define a second matrix; and disposing the encoded content of the second matrix in multiple empty second forms such that content of one column is disposed on only one of the empty second forms, each of the second forms includes the same type and number of fields as that of one of the filled first forms, further wherein the number of the filled second forms is based on the number of the one or more fields in the filled first forms.

Embodiments of the present disclosure also provide a method for handling data storage of application forms. The method includes scanning a filled first form comprising one or more first fields and one or more second fields, wherein a combination of one or more first fields reveals an identity of the consumer; identifying the one or more first fields with assistance from one or more users; identifying a plurality of filled first forms filled by one or more consumers based on a number of the identified first fields with assistance from the one or more users; extracting only filled out content from the plurality of filled first forms; arranging the extracted content of the first fields of the plurality of filled first forms in a first matrix including an equal number of rows and columns; encoding the content of each of the rows to define a second matrix; disposing the encoded content of the second matrix in one or more empty second forms such that content of one column is filled in only one of the empty second forms, wherein each of the second forms include the same type of one or more first fields and one or more second fields, and wherein the number of the filled second forms is based on the number of the one or more first fields; and saving the encoded content of the filled second forms in a database with assistance from an employee associated with a business process unit.

Embodiments of the present disclosure further provide a system for processing application forms before storing. The system includes a content extractor configured to extract only filled out content from a number of filled first forms associated with one or more consumers. Each of the plurality of filled first forms includes a number of fields. The system also includes a content manager configured to arrange the extracted content of one or more fields of the fields of the filled first forms in a first matrix including an equal number of rows and columns. The system further includes an encoder configured to encode the content of each of the rows of the first matrix to define a second matrix. The system further includes a database configured to store the encoded information about each of the consumers. The content manager is further configured to dispose the encoded content of the second matrix in a number of empty second forms, such that content of one column is disposed on only one of the empty second forms. Each of the second forms includes the same type and number of fields as that of one of the filled first forms.

BRIEF DESCRIPTION OF THE DRAWINGS

FIG. 5 illustrates an exemplary application form, in accordance with an embodiment of the present disclosure.

FIGS. 6A-6D illustrates four exemplary application forms selected for processing, in accordance with an embodiment of the present disclosure.

FIGS. 9A-9B illustrates a second matrix including encoded content of the application forms of FIG. 6, in accordance with an embodiment of the present disclosure.

FIGS. 10A-10D illustrates exemplary four application forms including encoded content.

DETAILED DESCRIPTION

Figure 1:
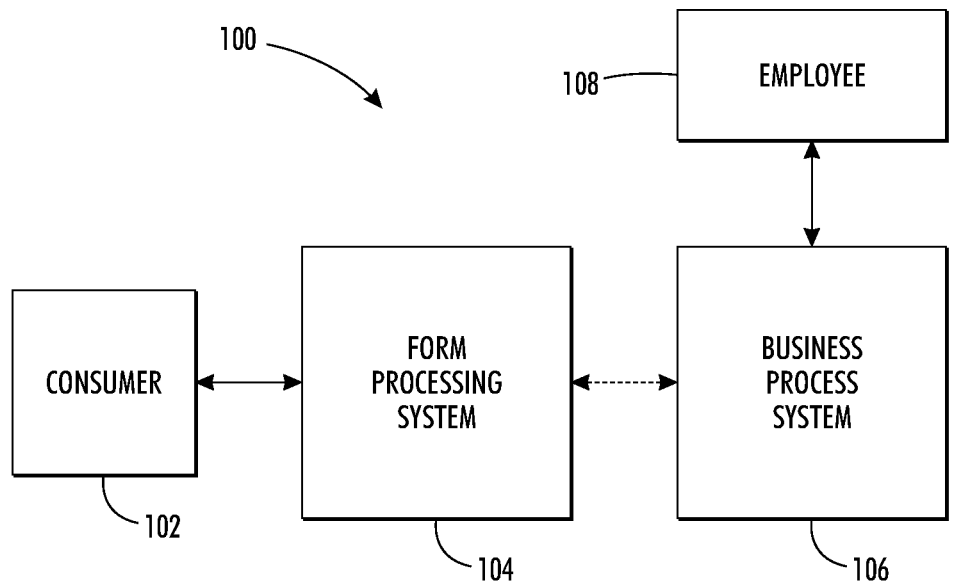
FIG. 1 illustrates an exemplary environment where various embodiments of the present disclosure may function.

The following detailed description is made with reference to the figures. Preferred embodiments are described to illustrate the disclosure, not to limit its scope, which is defined by the claims. Those of ordinary skill in the art will recognize a number of equivalent variations in the description that follows.

As used herein, a Multi-Function Device (MFD) as used herein includes a single device that offers a number of traditionally separate functionalities, such as printing, copying, scanning, and faxing. Further, "mobile device" refers to any device that has a wireless connection with a network or components related to the network.

The "mobile device" can also be a landline telephone as long as it can communicate with the MFD remotely. The present disclosure includes mobile consumers such as cell phones, Smartphones, PDAs, and so on. Moreover, an "address" is any identifying information that allows a device to be accessed on a network, such as an IP address or URL, the URL including both long form (including full protocol information, such as "http://") or short form, beginning with "www" or only a website name, such as "foobar.com". An "access code" is an identifier capable of designating a specific device, such as an MFD, on a computer network or local computer system. A "telephone number" is an identifier capable of identifying a device or location on a telephone network of any type, including traditional voice networks, packet-oriented switching, etc.

Overview

Embodiments of the present disclosure describe a system for processing content of different types of application forms such as application forms for insurance, bank account opening, etc. The systems and methods introduced in this disclosure aid employees to process different types of forms filled by different consumers in a confidential manner. The application form includes a number of first fields and a number of second fields. A combination of one or more of the first fields may reveal an identity of a consumer. The second fields may not reveal the identity of the consumer. It means that by knowing a consumer response to one or more first fields, one can know the identity of the consumer and much more about the consumer. The form processing system may be a single device or a combination of one or more devices for processing different types of documents or forms to be filled in by the consumers.

The form processing system scans a plurality of filled first forms and extracts content or responses of one or more first fields and the one or more second fields. The extracted content of the second fields relates to one or more second fields in one or more unfilled original application forms. The extracted content of the first fields is arranged in a first matrix including equal number of rows and columns. In the first matrix, each of the columns includes first fields of the application form, and each of the rows includes responses filled by one or more consumers in the first fields. The content of each of the rows is encoded by shuffling it using any predefined algorithm such as, but not limited to, circular right shift algorithm. The content of each of the columns is then filled in the partially filled original application forms, which includes unfilled first fields. These filled original forms now include encoded content. The filled application forms are also assigned a unique identity or name. Now these forms including encoded content in the first fields may be printed and given to an employee of the business process system for further processing. The employee may then enter the details from these encoded forms into a database or system. The database now includes encoded data.

The back office or a business process system of the business processing company may include means for further processing the document in a manner known in the art. For example, banks have a central branch or head office that processes the application forms filled by the consumers and maintains a record of all the consumers. The form processing system may include templates of application forms. The employee or the system may select the appropriate template.

FIG. 1 illustrates an exemplary environment 100 where various embodiments of the present disclosure may function. To analyse the present disclosure, the environment 100 can be visualized as having four primary components: one or more consumers 102, a form processing system 104, a business process system 106, and one or more employees 108 of the business process system 106. Hereinafter, consumer 102 may refer to a single consumer 102. The consumer 102 may have to fill out forms, for example, applications for bank accounts, Dish TV service, purchasing property, insurance policies, etc. Service providers commonly require consumers to fill out forms for registering or providing services. These may include banking, dish TV service, cabs, tours, travels, and so forth to the consumers. The form processing system 104 processes two or more filled application forms that are filled by the consumer 102.

Each application form or document to be filled out includes multiple fields that are to be filled out. The multiple fields can be one or more first fields and one or more second fields. In this manner, the consumer may fill out pre-printed physical forms. In some embodiments, the filled application forms are hand-filled forms and the consumer(s) may fill the first form manually. A combination of the one or more first fields may include responses from the consumer 102, which may reveal an identity of the consumer 102 or may identify the consumer 102. Examples of the first fields include, but are not limited to, social security number (SSN), license number, address, and so forth. The responses of the second fields may not identify the consumer 102. An example of the second fields include, but are not limited to, age, date of birth, marital status, monthly income, and so forth.

The form processing system 104 may identify a template of the original application form (hereinafter referred to as a form template) with assistance from one of the employees 108. In an embodiment, one of the employees 108 may identify the form template for processing the filled out application form. The consumer 102 may place the filled form (hereinafter, referred to as a first form) on a platen or flat surface of the form processing system 104 in order to capture the information that is provided on the first form. In some embodiments, one of the employees 108 may place the first form on a platen or flat surface of the form processing system 104 in order to capture the information on the first form. The consumer 102 or the employee 108 may interact with the form processing system 104 through a graphical user interface. In one embodiment, the consumer 102 may deposit the form, and the form may be processed further by another employee 108 at the form processing system 104. The form processing system 104 may be associated with one or more service providers or business process system 106. For example, the form processing system 104 can be of an XYZ bank, which supports the various application forms of the XYZ bank.

The form processing system 104 is configured to scan the application forms that have been filled out by hand by one or more of the consumers 102. The content of each filled application form may be extracted and the content of one or more first fields may be arranged in a first matrix having equal number of rows and columns. Thereafter, the content in each of the rows is encoded or shuffled by using a predefined algorithm, such as, circular right shift, by the form processing system 104 to result into a second matrix. The content of each column of the second matrix is placed in one or more blank versions of the original application forms (hereinafter, referred as second forms). These filled second forms are assigned a unique name by the form processing system 104. The filled second forms including the encoded data are given to one of the employees 108 for entering the content into a database of the business process system 106. Hereinafter, an employee 108 may refer to one employee associated with the business process system 106.

Figure 2:
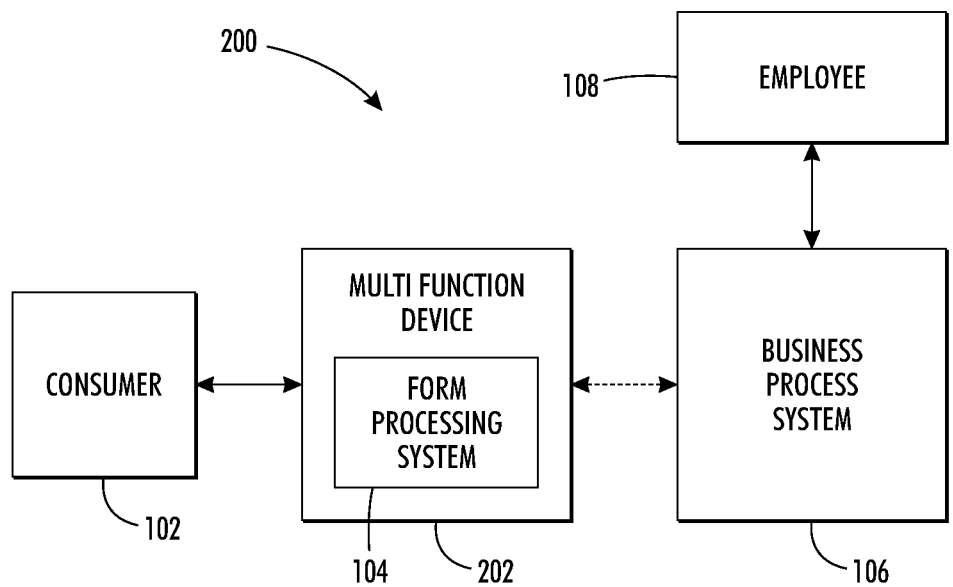
FIG. 2 illustrates another exemplary environment where various embodiments of the present disclosure may function.

FIG. 2 illustrates another exemplary environment 200 where various embodiments of the present disclosure may function. As discussed with reference to FIG. 1, the form processing system 104 can process and encode content of the filled out two or more application forms according to the type of form. As shown, the one or more of the consumers 102 can access one or more services from a Multi-Function Device (MFD) 202. In the environment 200, the form processing system 104 is an integrated system within the MFD 202. The MFD 202 is a device that performs printing, scanning, copying, or other known imaging functions. It will be understood that the MFD 202 may perform one, few, or all of the mentioned operations without departing from the scope of the present disclosure. For example, the MFD 202 may be a standalone printer or facsimile machine. Alternatively, the MFD 202 may be a three-in-one printer, scanner, and copier. Further, the MFD 202 may include a suitable interface allowing it to connect with a network and with mobile devices. These interfaces include a network interface, cellular interface, or parallel to serial interface. In the illustrated embodiment, the MFD 202 includes a network interface facilitating network connectivity. In some embodiments, the one or more of the consumers 102 can fill a form and submit it at the MFD 202 using one or more interfaces of the MFD 202.

The form processing system 104 can scan and process the application forms including the filled-out first fields and second fields. The filled out application form may include one or more field responses, which may include confidential information that can reveal much more information of the consumer 102. If the filled out application forms with their filled out fields are sent directly to the business process system 106 for further processing and actions, then the employees 108 may misuse the confidential information about the consumers 102. In some embodiments, a combination of the one or more first fields may identify or reveal the identity of the one or more consumer 102. For example, a person's identity can be determined or revealed from his/her SSN. Therefore, responses of the consumer 102 that can reveal identity of the consumer 102 need to be kept confidential to avoid any misuse of such information. For such situations, the present disclosure provides a solution by integrating the form processing system 104 in the MFD 202 itself. The document or the filled first forms are processed at the MFD 202 by the form processing system 104 prior to giving them to any of the employees 108 for further processing at the business process system 106. The form processing system 104 can extract the content from the filled out application form (hereinafter, referred as first forms) and can embed the extracted content into the fillable first and second fields of a blank or empty application form (hereinafter, referred as a second form). The form processing system 104 may be configured to encode the responses of the first fields prior to placing the encoded content corresponding to the first fields in the second form. Each of the second forms may be assigned a unique name or identity by the form processing system 104. Thereafter, these second forms are handed over to the employee 108 for further processing.

Figure 3:
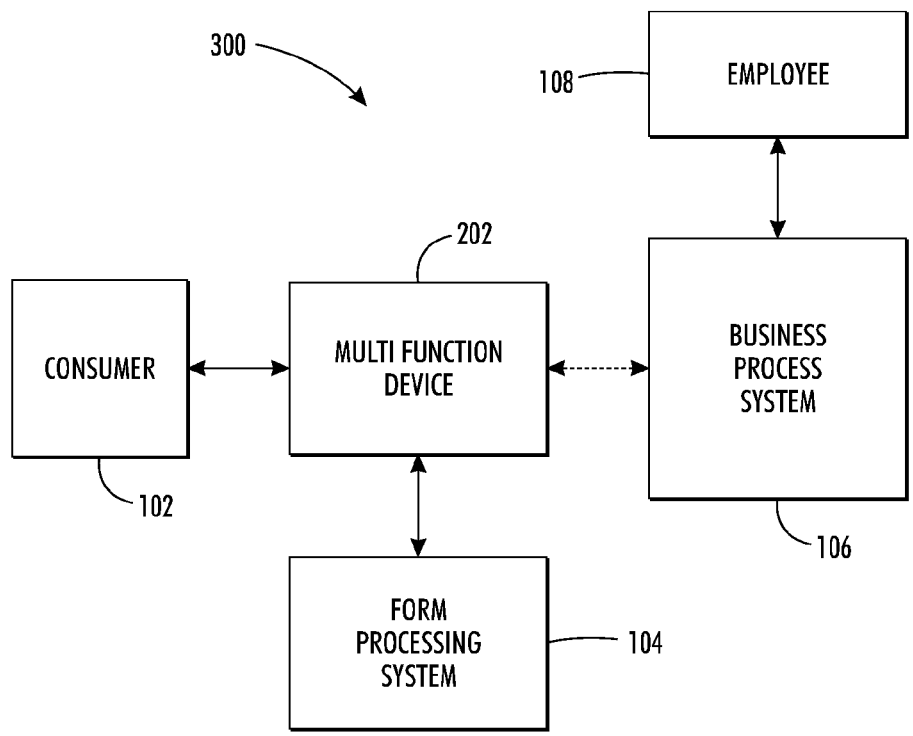
FIG. 3 illustrates yet another exemplary environment where various embodiments of the present disclosure may function.

In one embodiment, the form processing system 104 is not integrated into the MFD 202. However, the MFD 202 can connect to the form processing system 104 through a wired or wireless means as shown in FIG. 3. In environment 300, the consumer 102 can submit a filled first form at the MFD 202; the first form is then forwarded to the attached form processing system 104. In an embodiment, the second form, including the encoded content, can be printed or presented to one or more of the employees 108. The employee 108 may further enter the content of the second form into a system or a database for storage or further processing. Therefore, the database stores encoded information about each consumer 102. When a user who is authorized to access information about the consumers 102 requests information, the form processing system 104 may decode the content of the second forms and present it to a user in an appropriate form.

Figure 4:
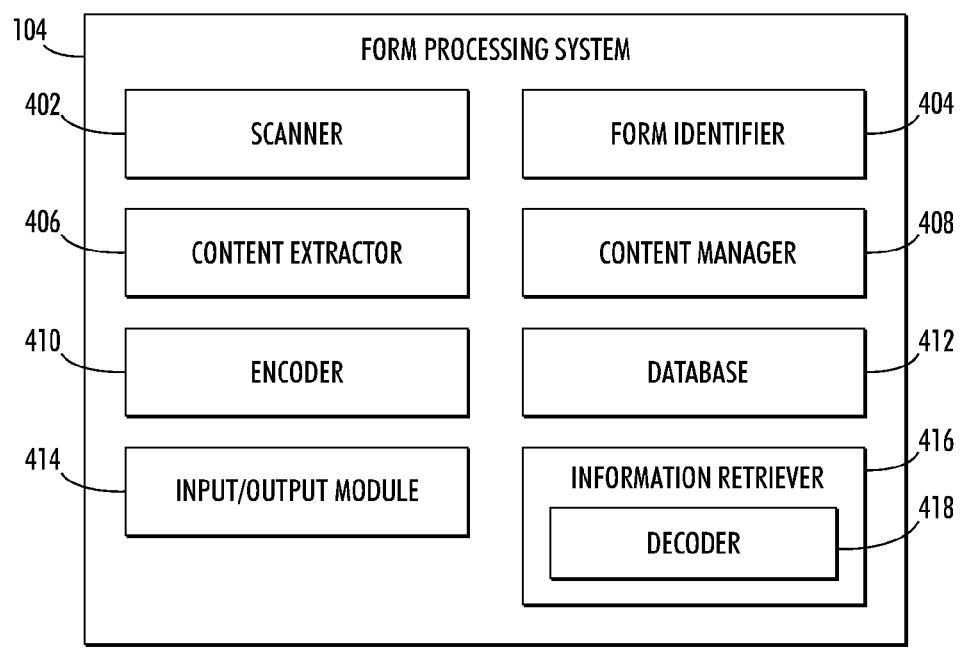
FIG. 4 illustrates structural components of a form processing system in accordance with an embodiment of the present disclosure.
Figure 6A:
Figure 6C:
Figure 6D:

FIG. 4 illustrates structural components of the form processing system 104, in accordance with an embodiment of the present disclosure. As discussed with reference to FIG. 1, the consumer 102 can fill an application form including one or more first fields and second fields by hand. In addition, the form processing system 104 can process the application forms filled by one or more consumers 102. The form processing system 104 includes a scanner 402 for scanning the application form filled by the one or more consumers 102. The form processing system 104 further includes a form identifier 404 for identifying the first fields from the scanned fields with assistance from one or more employees 108. The form identifier 404 is further configured to identify two or more application forms for processing based on the number of identified first fields with assistance from the one or more employees 108. The number of forms identified or selected for processing depends on the number of first fields. For example, if there are seven first fields in the application form then six additional forms are selected by the form identifier 404 for processing and in total seven forms including the scanned form is processed. The form processing system 104 may further include a content extractor 406 for extracting content from the first fields and the second fields of the identified filled first forms.

A content manager 408 then places or disposes the extracted content of the second fields in an empty original form (hereinafter, referred as a second form) to fill it partially. The content manager 408 further arranges the extracted content of one or more first fields of the filled first forms in a first matrix having equal number of rows and columns. The content is arranged in such a manner that each row includes content from an application form associated with a different consumer 102. The number of rows is equal to the number of application forms and number of columns is equal to the number of first fields in the filled application form. The form processing system 104 also includes a database 412 for storing empty original forms or form templates. An encoder 410 may encode the content of each of the rows of the first matrix by shuffling the content to form a second matrix. The content may be reshuffled by using any suitable conventional algorithm such as, but are not limited to, a circular right shift algorithm.

In an embodiment, the content is shuffled such that the content of first row is shifted one places right, the content of the second row is shifted two places to right, and the content of the third row is shifted three places to right, and so forth. Thereafter, the content manager 408 may place or dispose the content of each column of the second matrix in one or more first fields of the partially filled second form. The content manager 408 may further assign a unique name or identity (ID) to each of these second forms. The form processing system 104 may also include an Input/Output (IO) module 414 for printing these application forms. Then, the printed forms may be handed over to the employee 108 for storing data into the business process system 106 or the database 412. The second forms with unique ID include encoded data of the consumers. Therefore, this way the employee 108 will never know the correct information of the consumers and may store the data in a confidential manner.

In an embodiment, the content in the database 412 is accessible to only authorized users. When an authorized user wants to see an application form of a particular consumer 102, an information retriever 416 may retrieve the information of the consumer 102 based on the request received from the authorized user. The information retriever 416 includes a decoder 418 for decoding the content of the form. The information retrieving process includes identifying the one or more forms that include encoded data. The form identifier 404 may identify the one or more second forms including the encrypted content based on their unique IDs. The content extractor 406 may extract the content from these forms. Then, the content manager 408 may arrange the content of the first fields in a matrix. Thereafter, the decoder 418 may decode the content of the second matrix by using a conventional algorithm such as, left circular shift to define a third matrix. The content is re-shuffled such that the content of the first row is shifted one place to the left, the content of the second row is shifted two places to left, and the content of the third row is shifted three places to left, and so forth. After decoding, the third matrix includes the content of each of the consumers 102 in correct form. The content of each of the rows of the third matrix is placed or disposed in the first fields of an empty original form (or third form) along with the extracted content of the second fields. The IO module 414 may present the filled third form to the authorized user in different ways. In an embodiment, the filled third form may be displayed to the authorized user on a display module. In another embodiment, the filled third form may be printed and presented to the authorized user in paper form or as a hard copy.

FIG. 5 illustrates an exemplary application form 500, in accordance with an embodiment of the present disclosure. Though the application form 500 shown is a health insurance form but a person skilled in the art will appreciate that it can be any type of application form associated with any type of business process system. The application form 500 includes a number of first fields 502A-502D. One of these first fields 502A-502D may identify or reveal the identity of the consumer 102. FIG. 5 shows only four first fields 502A-502D (hereinafter, collectively referred as first fields 502), but a person skilled in the art will appreciate that the application form 500 may include any number of first fields 502. A combination of the first fields 502A-502D may identify the consumer 102. Examples of the first fields 502A-502D may include, but are not limited to, date of birth, name, SSN, mobile phone number, and so forth. In addition, the application form 500 may include a number of second fields. Examples of the second fields may include, but are not limited to, father's name, street number, occupation, and so forth.

FIGS. 6A-6D illustrates four exemplary application forms 600A-600D that are identified for processing, in accordance with an embodiment of the present disclosure. As discussed with reference to FIG. 1, the filled application form 600A is associated with a first consumer of the consumers 102, the form 600B is associated with a second consumer of the consumers 102, the form 600C is associated with a third consumer of the consumers 102, and the form 600D is associated with a fourth consumer of the consumers 102. Each of these forms 600A-600D includes a number of first fields 602, 604, 606, and 608 and second fields (not shown). The form 600A includes first fields 602A, 604A, 606A, and 608A. The form 600B includes four first fields 602B, 604B, 606B, and 608B. The form 600C includes four first fields 602C, 604C, 606C, and 608C. Similarly, the form 600D includes four first fields 602D, 604D, 606D, and 608D.

As discussed with reference to FIG. 4, the form identifier 404 may identify the forms 600A-600D for processing based on the number of first fields in the filled application form and with assistance from the one or more employees 108. Further, the number of forms selected or identified for processing includes the initially scanned form. Further, the filled application forms 600A-600D are similar forms and include the same number and type of first fields 602-608 and second fields. In an embodiment, the consumers 102 can fill these forms 600A-600D manually. In another embodiment, the consumers 102 may fill the application forms 600A-600D electronically, for example, using a keyboard on a computer.

Figure 7:
FIG. 7 illustrates the exemplary extracted content of one of the application forms of FIG. 6.

As discussed with reference to FIGS. 1, 4, and 6, after identifying the application forms 600A-600D and the first fields 602-608, the content extractor 406 may extract content from the first fields 602-608 and second fields of the forms 600A-600D. FIG. 7 shows the exemplary extracted content of one of the application forms 600A-600D of FIG. 6. The content manager 408 may be arranged in a first matrix including an equal number of rows and columns as shown in FIG. 8A-8B.

Figure 8A:
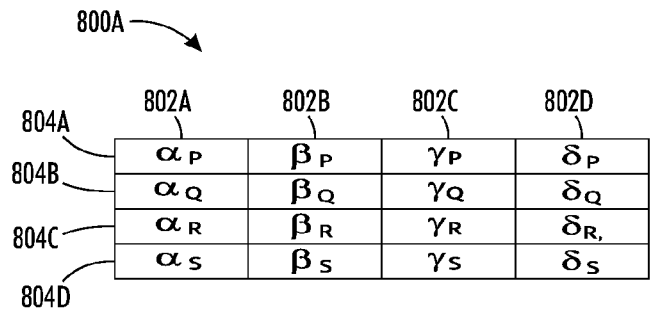
FIGS. 8A-8B illustrates a first matrix including the extracted content of application forms of FIG. 6.
Figure 8B:
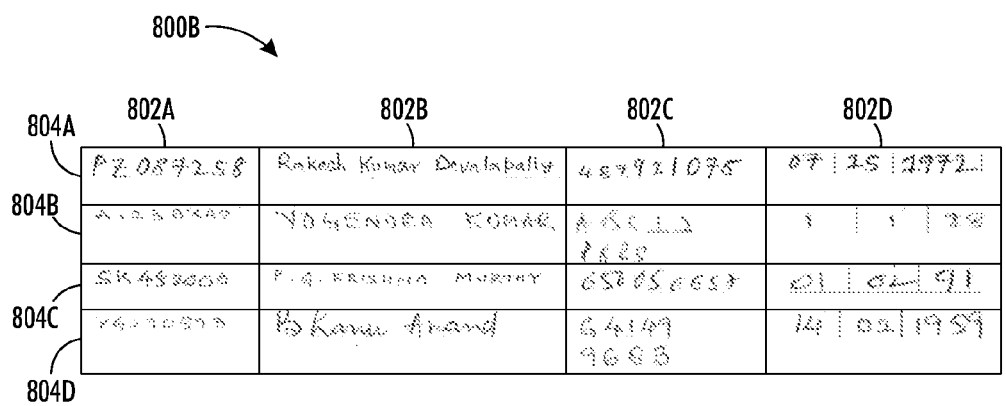
Figure 10A:
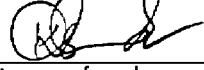
Figure 10C:
Figure 10D:
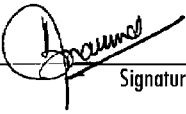

FIGS. 8A-8B illustrates a first matrix 800A and a first matrix 800B including the extracted content of application forms 600A-600D of FIG. 6. The first matrix 800A depicts the extracted content of the first fields 602-608 of the four application forms 600A-600D by using symbols. The first matrix 800B depicts the actual content of the forms 600A-600D. The content of the first fields 602-608 includes the responses of the consumers 102 to these fields 602-608. The responses to the four first fields 602-608 of the forms 600A-600D are depicted as $\alpha$, $\beta$, $\gamma$, and $\delta$ respectively in the first matrix 800A. A first row 804A includes extracted content of the first form i.e. the application form 600A. For example, in the first row 804A, '$\alpha_P$' refers to the content of first field 602A, '$\beta_P$' refers to content of first field 604A, '$\gamma_P$' refers to content of first field 606A, and '$\delta_P$' refers to content of first field 608A. A second row 804B includes extracted content of the form 600B. In the second row 804B, '$\alpha_Q$' refers to the content of the first field 602B, '$\beta_Q$' refers to content of the first field 604B, '$\gamma_Q$' refers to content of the first field 606B, and '$\delta_Q$' refers to the content of the first field 608B. A third row 804C includes extracted content of the application form 600C. In the third row 804C, '$\alpha_R$' refers to the content of the first field 602C, '$\beta_R$' refers to content of the first field 604C, '$\gamma_R$' refers to content of the first field 606C, and '$\delta_Q$' refers to the content of the first field 608C. A fourth row 804D includes extracted content of the form 600D. Similarly, in the fourth row 804D, '$\alpha_S$' refers to the content of the first field 602D, '$\beta_S$' refers to content of the first field 604D, '$\gamma_S$' refers to content of the first field 606D, and '$\delta_S$' refers to the content of the first field 608D.

FIG. 8B illustrates the first matrix 800B that includes extracted content of the first fields 604-608 of the filled application forms 600A-600D. A column 802A includes content of the first field 602 of the four application forms 600A-600D. A column 802B includes content of the first field 604 of the four application forms 600A-600D. A column 802C includes the content of the first field 606 of the four application forms 600A-600D. A column 802D includes the content of the first field 608 of the four application forms 600A-600D. The encoder 410 may encode the content of the first matrix 800B (or 800A). The content of the matrix 800B may be encoded by reshuffling the content of each of the rows 804A-804D by using a predefined algorithm.

Figures 9A, 9B:
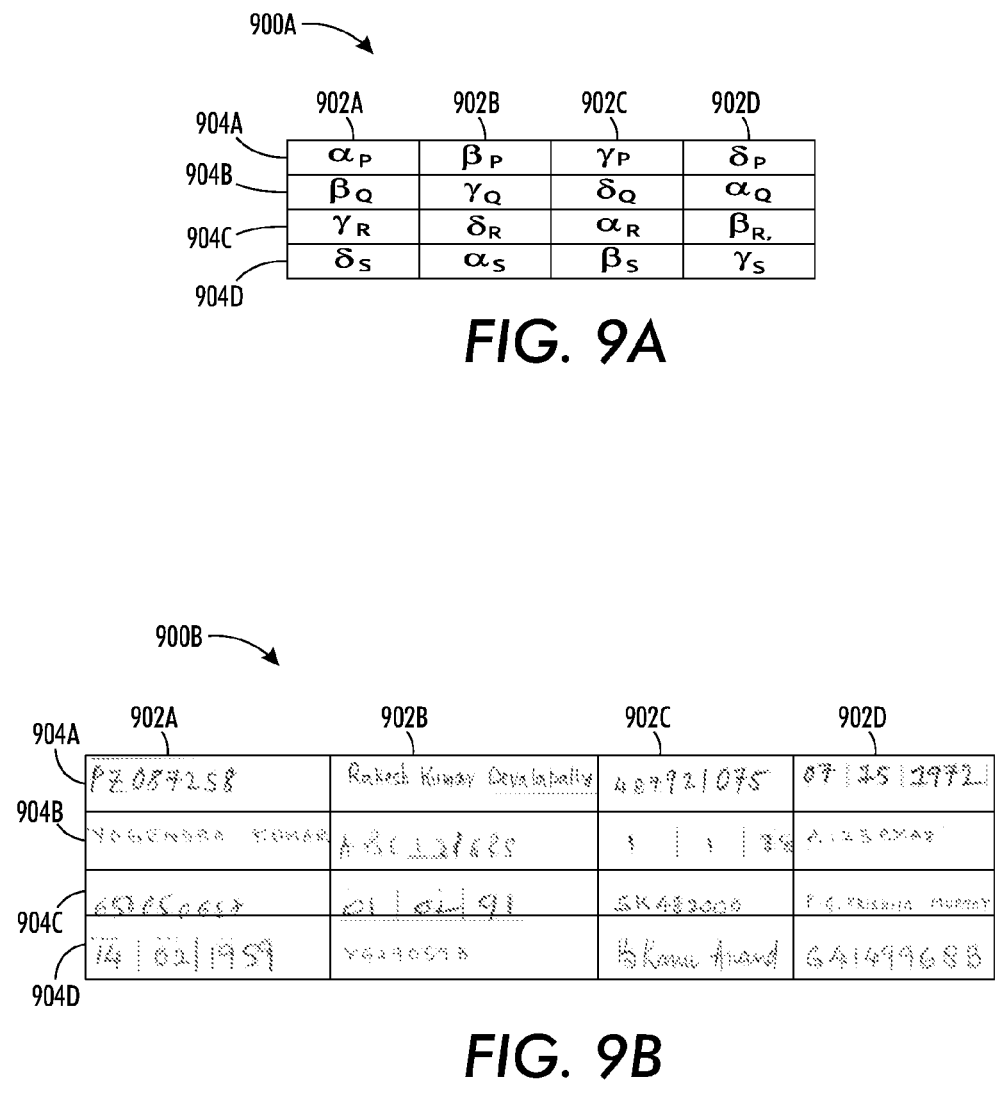

FIGS. 9A-9B illustrates a second matrix 900A and a second matrix 900B including the encoded content of the first matrix 800A and the first matrix 800B respectively. As discussed with reference to FIG. 6, the encoded content of the first fields 602-608 are arranged in different columns 902A-902D and is depicted as symbols in the second matrix 900A. The encoded content of the first fields 602A-608A of the first application form 600A are arranged in a first row 904A. The encoded content of the first fields 602B-608B are arranged in a second row 904B. The encoded content of the first fields 602C-608C are arranged in a third row 904C. The encoded content of the first fields 602D-608D are arranged in a fourth row 904D. After shuffling, the content of each of the rows 804A-804D of the first matrix 800A-800B results in the second matrix 900A-900B.

Thereafter, the content of each of the columns 902A-902D of the second matrix 900B is disposed in four different application forms 1000A-1000D (or empty second forms 1000A-1000D) as shown in FIG. 10A-10D. Hereinafter, the application forms 1000A-1000D may be referred as second forms 1000A-1000D. The second form 1000A includes encoded content of the column 902A, the second form 1000B includes content of the column 902B, the second form 1000C includes encoded content of the column 902C, and the second form 1000D includes content of the column 902D. The content of the columns 902A-902D are placed on the first fields 1002-1008 of the second forms 1000A-1000D respectively. Each of the second forms 1000A-1000D includes content from the four different first forms 600A-600D. For example, the content of four first fields 1002A-1008A in the second form 1000A is actually content belonging to first fields of four first forms 600A-600D. Therefore, no user can identify the identity of the consumer 102 from a single form as the content or information in a single form is actually information of four different consumers 102. The application forms 1000A-100D are also assigned a unique identity or name by the content manager 408. Their unique IDs help the content processing system to decode the content when an authorized user requests for an application form of a particular consumer.

When the authorized user requests the information of the consumer 102, the information retriever 416 may present the information to the authorized user. The content extractor 406 extracts the content of the first fields 1002-1008 of the application forms 1000A-1000D. As discussed with reference to FIG. 4 and FIG. 9, the content manager 408 arranges the extracted content of the first fields 1002-1008 in a third matrix (not shown). Thereafter, the decoder 418 decodes by shuffling the data of each of the rows of the said third matrix. In an embodiment, the method for decoding depends on the method used for encoding. For example, if the content was encoded using the right circular shift algorithm then the content is decoded using the left circular shift algorithm and vice versa. Any conventional decoding method may be used to decode the content of the second matrix 900A-900B. The decoded content of the third matrix is then disposed corresponding to first fields (not shown) of a row of the said matrix on a blank version of the application form (or third form). The extracted content of the second fields is also disposed on the said partially filled third form. The IO module 414 then presents the application form including correct data in a suitable form such as, on a display module (not shown) or through a printer (not shown) to the authorized user.

Figure 11A:
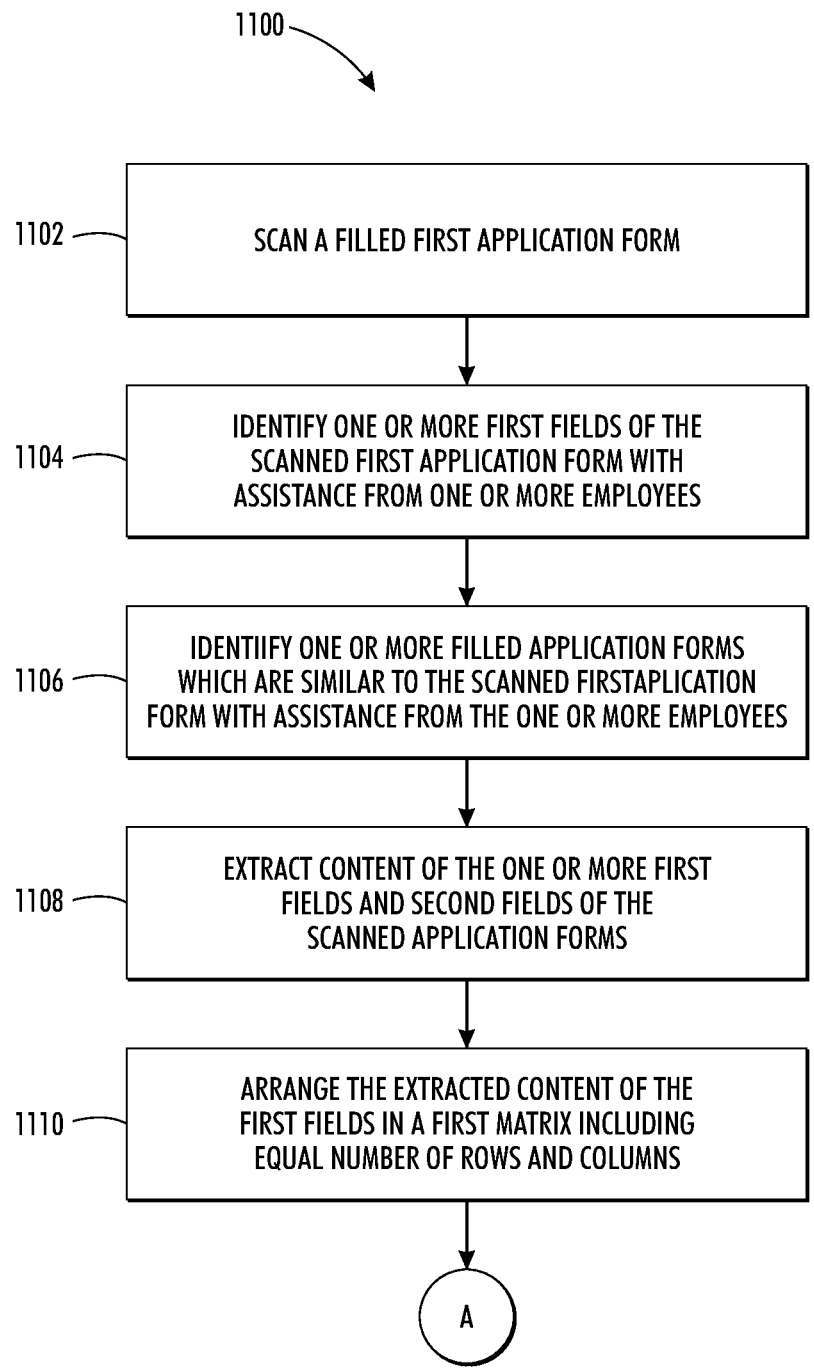
FIGS. 11A-11B is a flowchart illustrating a method for encoding content of one or more filled application forms.
Figure 11B:
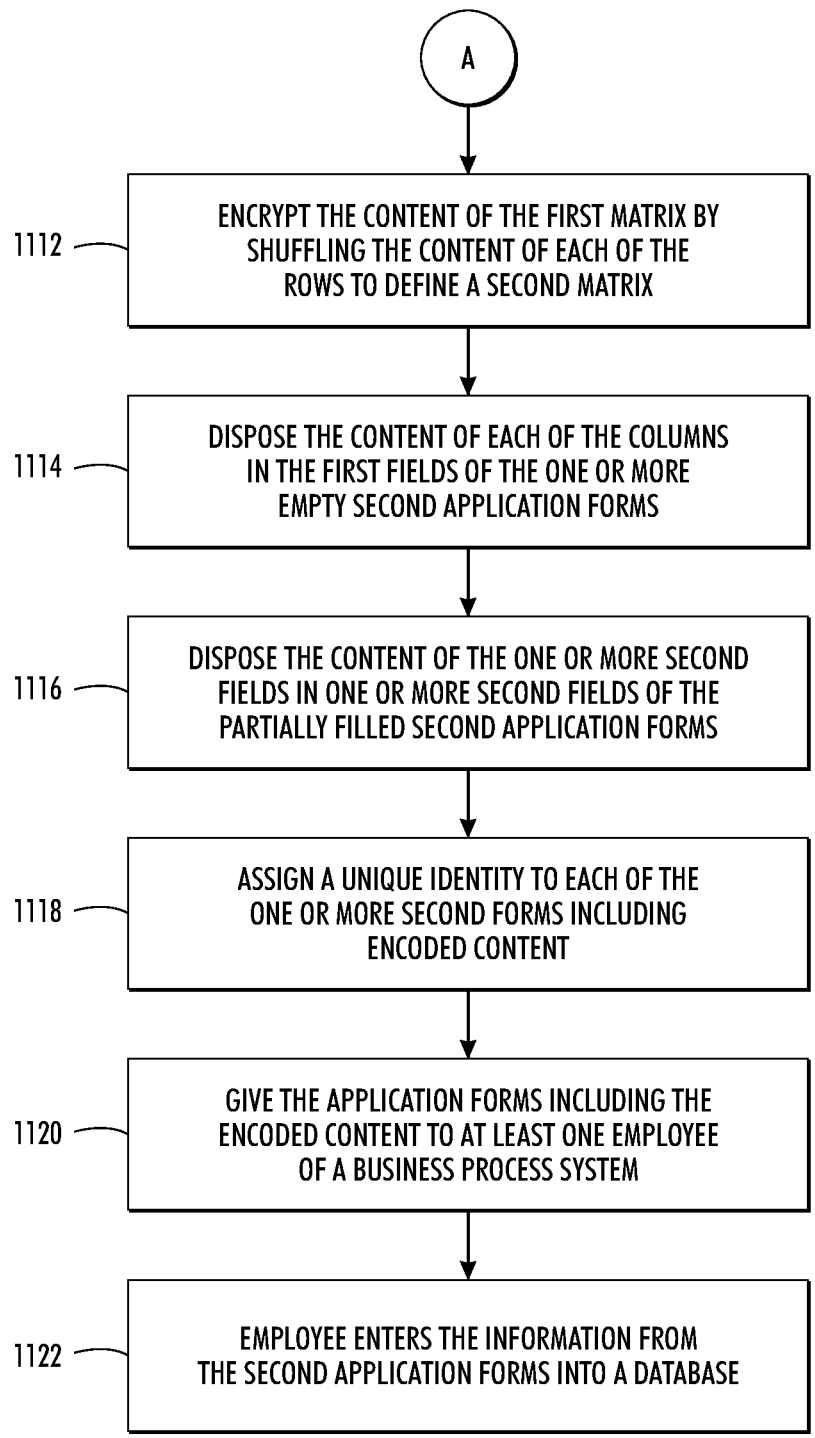

FIGS. 11A-11B is a flowchart illustrating a method for encoding content of one or more filled application forms. As described with reference to FIG. 1 to FIG. 10. The one or more consumers 102 may fill one or more application forms similar to the application form 500 as shown in FIG. 5. The form processing system 104 may process the content of filled application forms 600A-600D as shown in FIG. 6. The content of the filled application forms 600A-600B may be encoded as described in the below mentioned steps.

At step 1102, the scanner 402 scans a filled application form (hereinafter, referred to as a first form) that is filled by one of the consumers 102. The first form includes a number of fields including one or more first fields and second fields. A combination of the first fields may reveal an identity of the one of the consumers 102 who has filled the first form. The one or more consumers 102 may enter his/her responses in the first fields and the second fields on the first forms. At step 1104, the form identifier 404 may identify the one or more first fields from the first form with assistance from one or more employees 108. At step 1106, the form identifier 404 may identify one or more filled application forms that are similar to the scanned first form. The first form and the filled application forms include the same type of fields. The number of forms to be processed includes the first form, and the total number of forms to be processed is equal to the number of first fields in the first form. For example, if there are four first fields identified in the first form, then three more forms are identified and in total, there are four forms, which are processed.

At step 1108, the content extractor 406 extracts the content of the one or more filled first forms. The content manager 408 arranges the content of the one or more first fields of the one or more filled first forms in a first matrix having an equal number of rows and columns at step 1110. The columns of the first matrix refer to the one or more first fields. At step 1112, the encoder 410 encodes the content of each of the rows by shuffling the content of each row to define a second matrix. The second matrix includes the encoded content. The content may be shuffled by using any conventional algorithm such as, but are not limited to, right circular shift. For example, the content of the first matrix is encoded such that, content of the first row shifts one place to right, the content of the second row shifts two places to right, third row shifts three places to right, and so forth. For example, when there are four forms, if a first matrix having four columns and four rows is formed then the second matrix also includes four rows and four columns.

Then, at step 1114, the content of the second matrix is disposed or placed on the first fields of the one or more empty original application or second forms. The content is disposed on the first fields in such a manner that content of one column is placed on the first fields of a second form. Therefore, at step 1116, the four values in the first column of the encoded matrix are disposed on a first of the four second application forms. Similarly, the content of the second column is disposed on a second of the four second application forms, the content of the third column is disposed on a third of the four second application forms, and the content of the fourth column is disposed on a fourth of the second application forms.

At step 1118, the content manager 408 assigns unique IDs to these filled second forms. The unique IDs may include numbers, letters, symbols or combinations of these. At step 1120, the second application forms that include the encoded content of the second matrix are given to another employee 108 of the business process system 106. Thereafter, at step 1122, the another employee 108 may enter the data from theses second forms into the database 412 or on a database associated with the business process system 106.

Figure 12A:
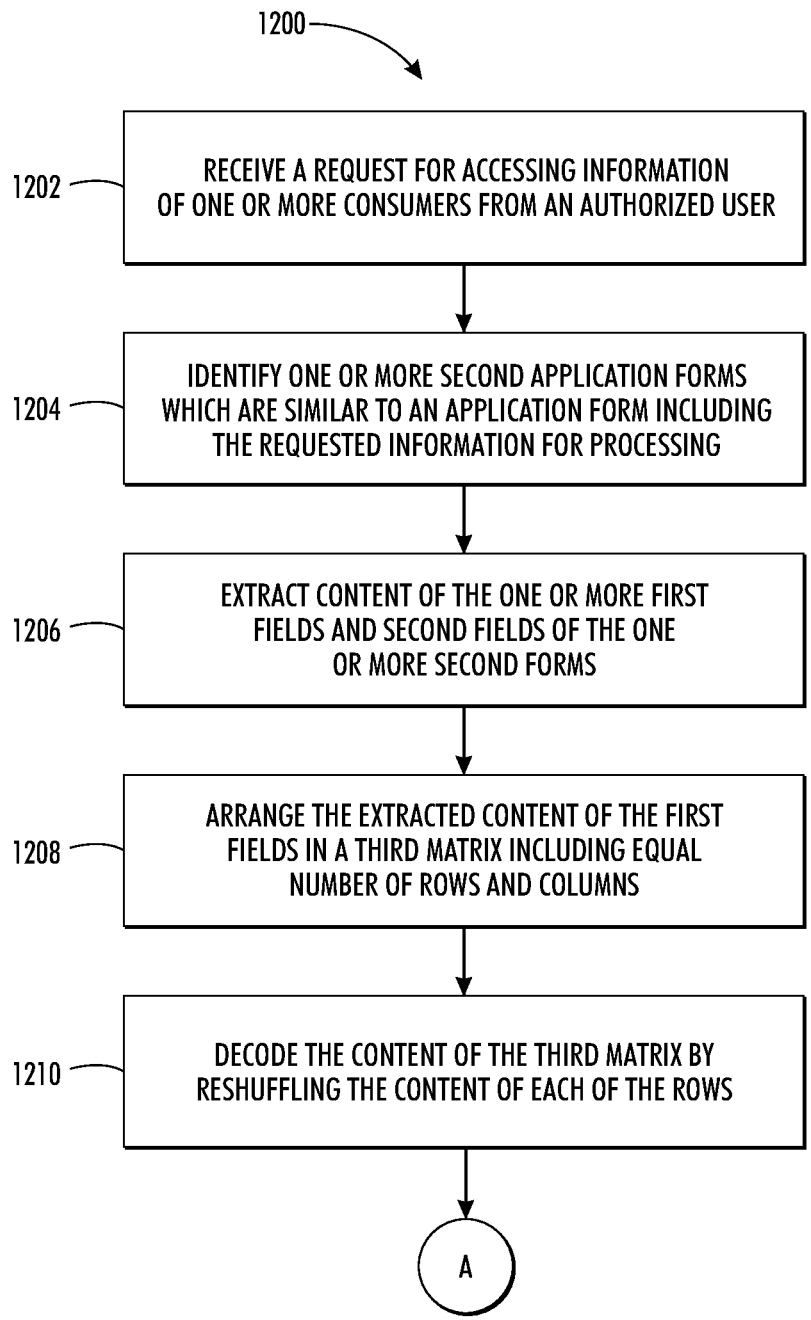
FIGS. 12A-12B is a flowchart illustrating a method for presenting the content of forms to an authorized user, in accordance with an embodiment of the present disclosure.
Figure 12B:
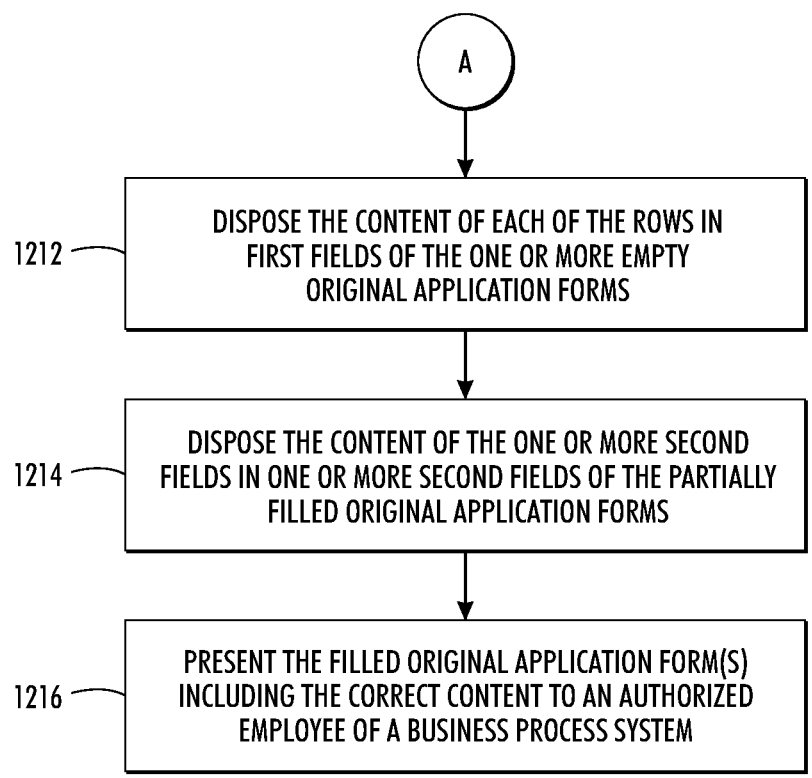

FIGS. 12A-12B show a flowchart illustrating a method for presenting the content of application forms to an authorized user, in accordance with an embodiment of the present disclosure. As discussed with reference to FIGS. 1-11, the form processing system 104 encodes the content of the filled application forms including the first form and places the encoded content on the one or more second forms. Only authorized employees of the employees 108 can access the correct data of the consumers 102. The authorized employees may request information of a particular consumer 102.

At step 1202, the form processing system 104 may receive a request for accessing information of one or more consumers 102 from an authorized employee of the employees 108. In an embodiment, the information retriever 416 may receive the request from the authorized employee. The content is present in encoded form in the database 412; therefore, the encoded content should be decoded before presenting it to the authorized employee. At step 1204, the form identifier 404 identifies one or more second forms from the database 412 or from a database of the business process system 106, based on their unique IDs. The second forms include the encoded data of the one or more filled first forms. Further, the second forms are similar to the application forms including the requested information. At step 1206, the content is extracted from the first field(s) and second field(s) of the one or more second forms. In an embodiment, the content extractor 406 may extract the content from the second forms. The content of the first fields extracted from the second forms is arranged in a third matrix of an equal number of rows and columns at step 1208, each second form content defining a row in the matrix. The content manager 408 may arrange the content in the matrix. Then, at step 1210, the content of each of the rows of the third matrix is decoded by reshuffling the content. The decoder 418 may reshuffle the content by using a predefined algorithm or method such as, but are not limited to, a left circular shift algorithm. Thus, in an embodiment, the algorithm or method used for decoding depends on the encryption method used for encoding the content.

At step 1212, the decoded content of the third matrix is disposed on first fields of one or more empty original application forms. The content is disposed such that, the content of each of the rows of the third matrix is disposed on an empty original form. At step 1214, the extracted content of the second fields are also disposed on the partially filled original forms. In an embodiment, the second fields are filled prior to the first fields in the empty original form. Thereafter, at step 1216, the filled original form(s) including the correct information or content is presented to the authorized employee 108 of a business process system 106. The IO module 414 may present the form to the authorized employee based on the request.

The methods and the system as disclosed in the present disclosure can be implemented by any business process automation. Any company with the needs of maintaining confidentiality of its consumers' identities would be interested in the disclosed systems and methods. An advantage of the disclosed system and method is that the identity of the consumer 102 on the application form is concealed before data entry and content is maintained intact.

It will be understood that the modules and the databases referred to in the previous sections are not necessarily utilized together in a single form processing system. Rather, these modules are merely exemplary of the various modules that may be implemented within a form processing system. Further, it will be understood that the form processing system and the MFD may include more modules than the ones described in this disclosure without departing from the scope of the present disclosure.

It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method for processing application forms, the method comprising:
    extracting only filled out content from a plurality of filled first forms associated with one or more consumers, wherein each of the plurality of filled first forms comprises a plurality of fields;
    arranging the extracted content of one or more fields of the plurality of fields of the plurality of filled first forms in a first matrix;
    encoding the content of each of the rows of the first matrix by circularly shifting each cell of each row by a number of columns, wherein the number of columns is not the same in each row to define a second matrix; and
    disposing the encoded content of the second matrix in a plurality of empty second forms such that content of one column is disposed on only one of the empty second forms, wherein each of the second forms includes the same type of fields as that of one of the filled first forms;
    wherein the number of the filled second forms is based on the number of the one or more fields in one form of the filled first forms.

2. The method of claim 1, wherein the plurality of fields comprises one or more first fields and one or more second fields, and wherein a combination of the one or more first fields of each of the filled first forms reveals an identity of a consumer associated with each of the filled first forms.

3. The method of claim 2, wherein the extracted content of the one or more first fields is arranged in the first matrix.

4. The method of claim 3 further comprising:
    scanning a filled first form;
    identifying the one or more first fields from the scanned form with assistance from one or more employees associated with a business process system, wherein the number of filled first forms required to define the first matrix is selected based on the number of identified first fields; and identifying the plurality of filled first forms based on the identified first fields with assistance from the one or more employees.

5. The method of claim 4 further comprising:
scanning the plurality of filled first forms associated with the one or more consumers, wherein a different consumer of the one or more consumers fills a separate form of the plurality of first forms manually;
disposing the extracted content of the one or more second fields in the corresponding second fields of the plurality of second forms;
associating at least one unique identity (ID) with each of the plurality of filled second forms; and
saving the encoded content of the filled second form in a database with assistance from another employee associated with the business process system.

6. The method of claim 5, wherein the database includes the encoded information about the one or more consumers.

7. The method of claim 6 further comprising retrieving the content of a consumer from the database based on a request received from an authorized employee, wherein the retrieving comprises:
identifying the plurality of filled second forms based on their unique IDs, wherein each of the second forms comprises encrypted content in the one or more first fields;
extracting the content of the one or more first fields and one or more second fields from the plurality of filled second forms;
arranging the extracted encoded content of the one or more first fields in a third matrix such that each row includes content from a separate filled second form;
decoding the content of each of the rows by reshuffling the content using a predefined algorithm;
filling the decoded content of the third matrix in one or more empty original forms such that content of a row is filled in only one of the empty original forms; and
presenting at least one filled original form including the decoded content to the authorized employee.

8. The method of claim 7, wherein the content of the first matrix is encoded by using
one or more predefined algorithms.

9. The method of claim 8, wherein the content of the first matrix is encoded by shuffling the content of the rows using a circular left shift algorithm and content of the third matrix is decoded by reshuffling the content of the rows using a circular right shift algorithm.

10. A method for handling data storage of application forms, the method comprising:
scanning a filled first form comprising one or more first fields and one or more second fields, wherein a combination of one or more first fields reveals an identity of the consumer;
identifying the one or more first fields with assistance from one or more employees associated with a business process system;
identifying a plurality of filled first forms filled by one or more consumers based on a number of the identified first fields with assistance from the one or more employees;
extracting only filled out content from the plurality of filled first forms;
arranging the extracted content of the first fields of the plurality of filled first forms in a first matrix including an equal number of rows and columns;
encoding the content of each of the rows of the first matrix by circularly shifting each cell of each row by a number of columns, wherein the number of columns is not the same in each row to define a second matrix;
disposing the encoded content of the second matrix in one or more empty second forms such that content of one column is filled in only one of the empty second forms, wherein each of the second forms include the same type of one or more first fields and one or more second fields, and wherein the number of the filled second forms is based on the number of the one or more first fields; and
saving the encoded content of the filled second forms in a database with assistance from another employee associated with the business process system.

11. The method of claim 10 further comprising:
scanning the plurality of filled first forms associated with the one or more consumers, wherein a different consumer of the one or more consumers fills a separate first form of the plurality of first forms manually;
disposing the extracted content of the one or more second fields on the corresponding second fields of the plurality of second forms; and
associating at least one unique identity (ID) with each of the plurality of filled second forms.

12. The method of claim 10 further comprising retrieving the content of a consumer from the database based on a request received from an authorized employee, wherein the retrieving comprises:
identifying the plurality of filled second forms based on their unique IDs;
extracting the content of the one or more first fields and one or more second fields from the plurality of filled second forms;
arranging the extracted encoded content of the one or more first fields in a third matrix such that each row includes content from a second form of the filled second forms;
decoding the content of each of the rows by re-shuffling the content using a predefined algorithm; and
filling the decoded content of the third matrix in one or more empty original forms such that content of a row is filled in only one of the empty original forms; and
presenting at least one filled original form including the decoded content to the authorized employee.

13. The method of claim 12, wherein the content of the first matrix is encoded using one or more predefined algorithms.

14. The method of claim 13, wherein the content of the first matrix is encoded using a circular left shift algorithm and the content of the third matrix is decoded using a circular right shift algorithm.

15. The method of claim 14, wherein the database includes the encoded information about the one or more consumers.

* * * * *